United States Patent [19]
Yoshida

[11] Patent Number: 5,570,365
[45] Date of Patent: Oct. 29, 1996

[54] LAN BRIDGE USING GATE CIRCUITS FOR PROTECTING HIGH-PRIORITY PACKETS FROM LOW-PRIORITY PACKET TRANSMISSIONS

[75] Inventor: Atsushi Yoshida, Tokyo, Japan

[73] Assignee: NEC Corporation, Japan

[21] Appl. No.: 399,902

[22] Filed: Mar. 8, 1995

[30] Foreign Application Priority Data

Mar. 9, 1994 [JP] Japan .................................... 6-066749

[51] Int. Cl.⁶ .................................................. H04L 12/46
[52] U.S. Cl. ........................ 370/85.6; 370/85.13; 370/60
[58] Field of Search ........................... 370/60, 60.1, 85.6, 370/85.13, 85.14, 94.1, 94.2

[56] References Cited

U.S. PATENT DOCUMENTS

| | | | |
|---|---|---|---|
| 5,058,109 | 10/1991 | Goldberg et al. | 370/85.13 |
| 5,132,966 | 7/1992 | Hayano et al. | 370/79 |
| 5,144,622 | 9/1992 | Takiyasu et al. | 370/85.13 |
| 5,390,176 | 2/1995 | Schoute et al. | 370/60.1 |
| 5,461,611 | 10/1995 | Drake, Jr. et al. | 370/54 |

FOREIGN PATENT DOCUMENTS 1-189252  7/1989  Japan .............................. H04L 11/00

Primary Examiner—Douglas W. Olms
Assistant Examiner—Russell W. Blum
Attorney, Agent, or Firm—Ostrolenk, Faber, Gerb & Soffen, LLP

[57] ABSTRACT

In a bridge for interconnecting local area networks, header detectors are associated respectively with the LANs for detecting a packet header contained in a packet transmitted from the associated LAN to a destination LAN. Registration tables are associated respectively with the LANs to store information representing packets which are to be protected from interference by other packets. Comparators are respectively associated with the header detectors as well as with the registration tables for comparing the packet header detected by the associated header detector with the information stored in the associated registration table to detect a match or mismatch. Gate circuits are associated respectively with the comparators for responding to the match for preventing the other packets from being forwarded to the destination LAN and responding to the mismatch for allowing the other packets to be forwarded to the destination LAN.

9 Claims, 4 Drawing Sheets

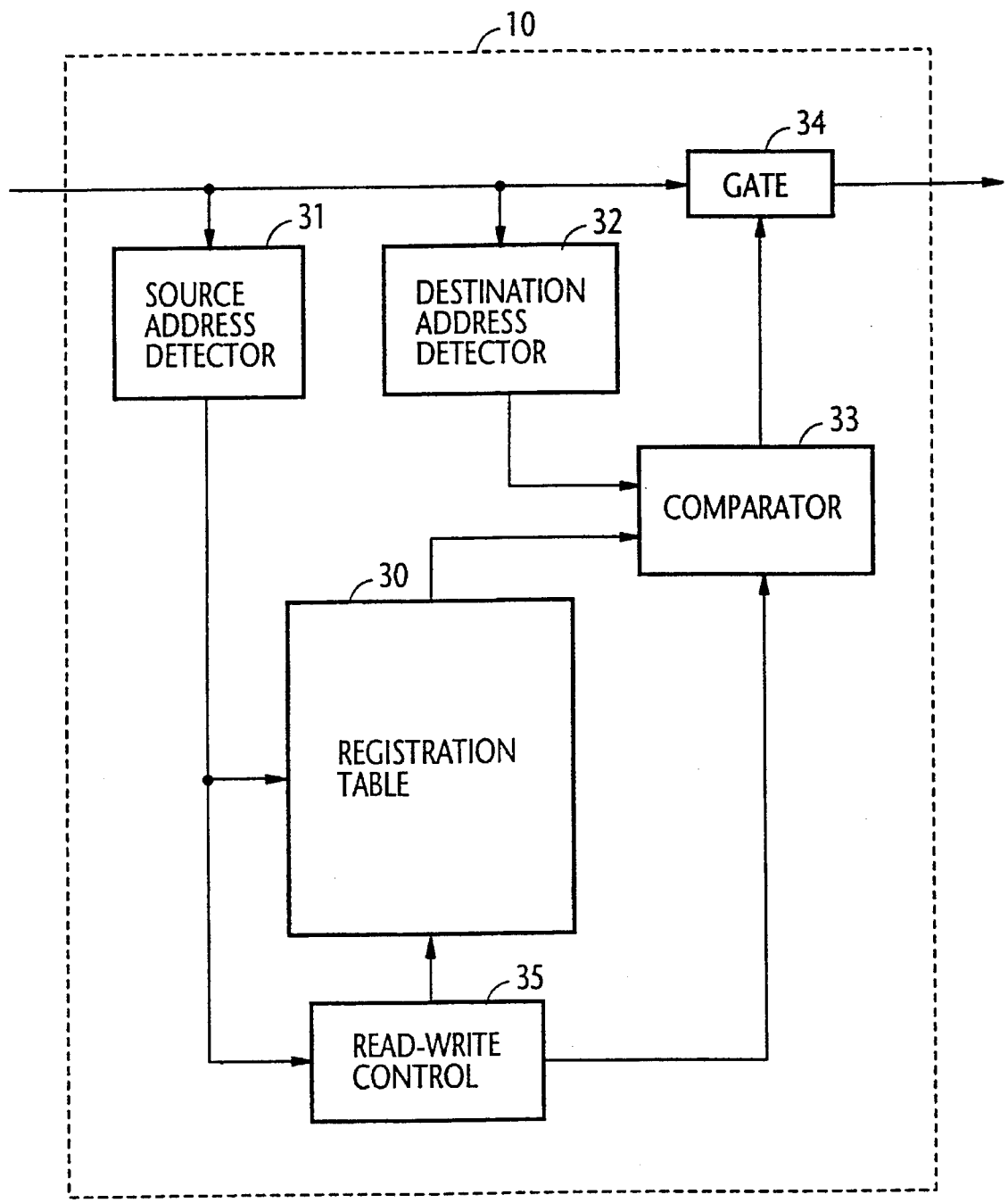

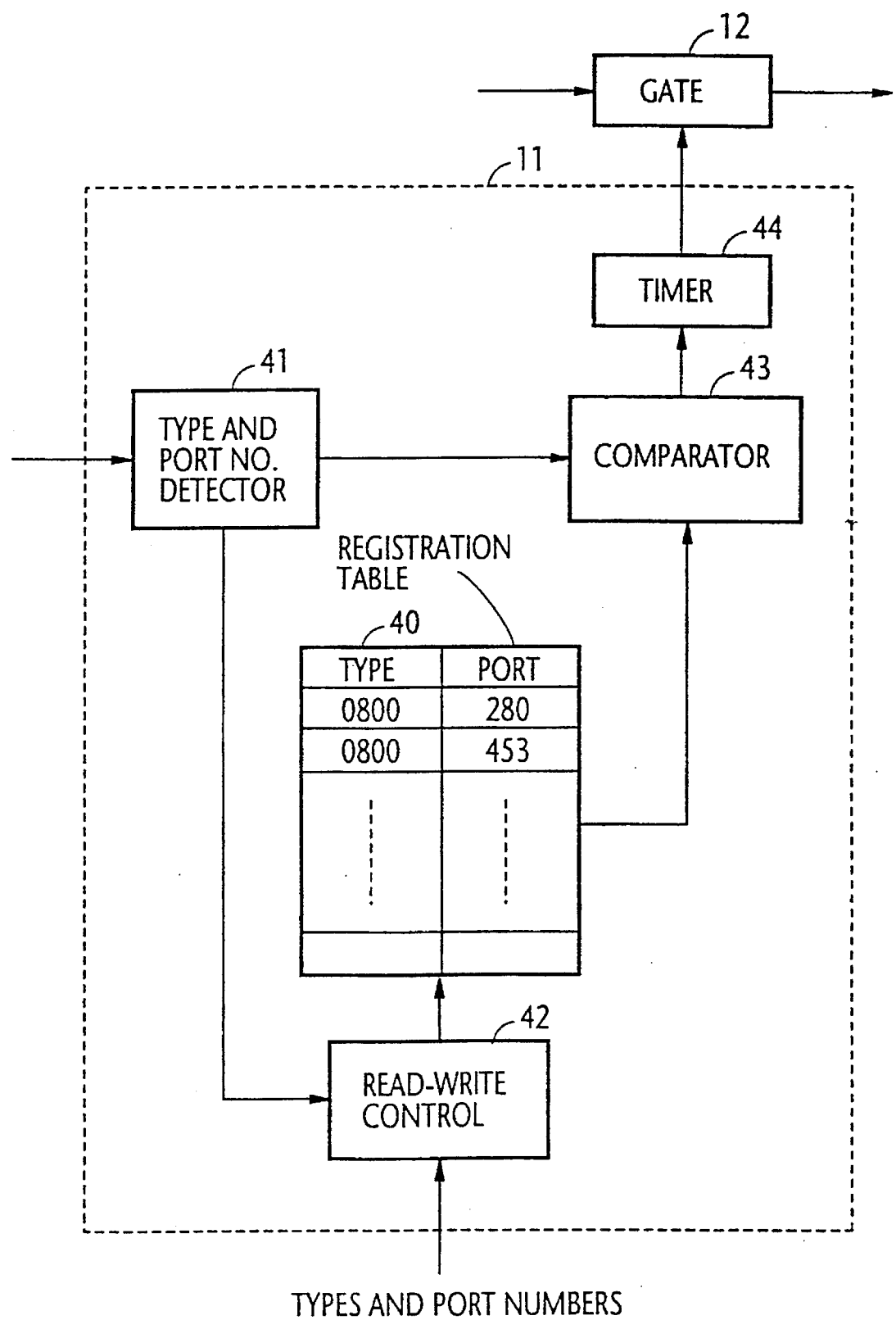

LAN BRIDGE USING GATE CIRCUITS FOR PROTECTING HIGH-PRIORITY PACKETS FROM LOW-PRIORITY PACKET TRANSMISSIONS

BACKGROUND OF THE INVENTION

1. Field of the Invention

The present invention relates generally to local area networks, and more specifically to a bridge for interconnecting local area networks at OSI (Open System Interconnection Reference Model) physical and data link layers.

2. Description of the Related Art

For interconnecting local area networks at the OSI lower two layers, a device called "layer-2 relay", or "bridge" is used. The conventional LAN bridge includes an address filter associated with one of the local area networks for allowing only those packets destined to local area networks other than the associated local area network to be forwarded from the bridge through an output port. Thus, packets destined to the home local area network are rejected by the bridge. Specifically, the address filter has a source address detector, a destination address detector and a registration table. The source address detector extracts a source address from a packet arriving from the associated local area network, the extracted source address being stored into the registration table. The destination address detector extracts a destination address from the packet. The registration table is then searched for an address identical to the extracted destination address. If the same destination address is stored in the registration table, the transmission of the packet from the bridge is prevented. If the same destination address is not detected in the registration table, it is recognized that the packet is destined to a local area network other than the associated network, and the packet is forwarded from the bridge. Such LAN bridges are usually provided one for each direction of transmission between two LANs so that all the LANs are interconnected to allow the terminals of each LAN to access the terminals of other networks. Therefore, the packets directed to a particular LAN are also transported to other LANs as well. For purposes of network management and maintenance, the bridge is also designed to relay broadcast packets specified by the protocol of the OSI network layer. Since the OSI network layer recognizes all the interconnected networks as a single entity, the broadcast packet from each LAN is transported to all the other local area networks.

Recent advances in technologies permit transmission of high-priority packets such as those transmitted using multimedia application software. However, such high priority packets are vulnerable to delays which would be caused by the transmission of low-priority packets destined to other local area networks over the common network facility as well as by broadcast packets.

Japanese Provisional Patent Publication (Tokkai-Hei) 1-189252 discloses a LAN bridge that prevents packets from being forwarded onto the common facility of an interconnected LAN network by appending a special code to each packet. However, protocols must be altered to prevent transfer of such packets.

SUMMARY OF THE INVENTION

It is therefore an object of the present invention to provide a LAN bridge which prevents the transmission of unnecessary packets without altering OSI protocols.

According to a broader aspect, the present invention provides a bridge for interconnecting a plurality of local area networks. The LAN bridge comprises a header detector for detecting a packet header contained in a packet transmitted from a first local area network to a second local area network, a registration table for storing information representing packets which are to be protected from interference by other packets, a comparator for comparing the packet header detected by the header detector with the information stored in the registration table to detect a match or mismatch, and a gate circuit responsive to a match detected by the comparator for preventing the other packets from being forwarded to the second local area network and responsive to a mismatch detected by the comparator for allowing the other packets to be forwarded to the second local area network.

In a specific aspect, the information stored in the registration table represents a packet header that identifies multimedia application software.

According to a further specific aspect, a bridge for interconnecting a plurality of local area networks comprises a plurality of header detectors associated respectively with the local area networks, each of the header detectors detecting a packet header contained in a packet transmitted from the associated local area network to a destination local area network, a plurality of registration tables associated respectively with the local area networks, each of the registration tables storing information representing packets which are to be protected from interference by other packets, a plurality of comparators respectively associated with the header detectors and respectively associated with the registration tables, each of the comparators comparing the packet header detected by the associated header detector with the information stored in the associated registration table to detect a match or mismatch, and a plurality of gate circuits associated respectively with the comparators, each of the gate circuits being responsive to a match detected by the associated comparator for preventing the other packets from being forwarded to the destination local area network and responsive to a mismatch detected by the associated comparator for allowing the other packets to be forwarded to the destination local area network.

BRIEF DESCRIPTION OF THE DRAWINGS

The present invention will be described in further detail with reference to the accompanying drawings, in which:

FIG. 3 is a block diagram of each address filter of FIG. 1; and

FIG. 4 is a block diagram of each decision circuit of FIG. 1.

DETAILED DESCRIPTION

Figure 1:
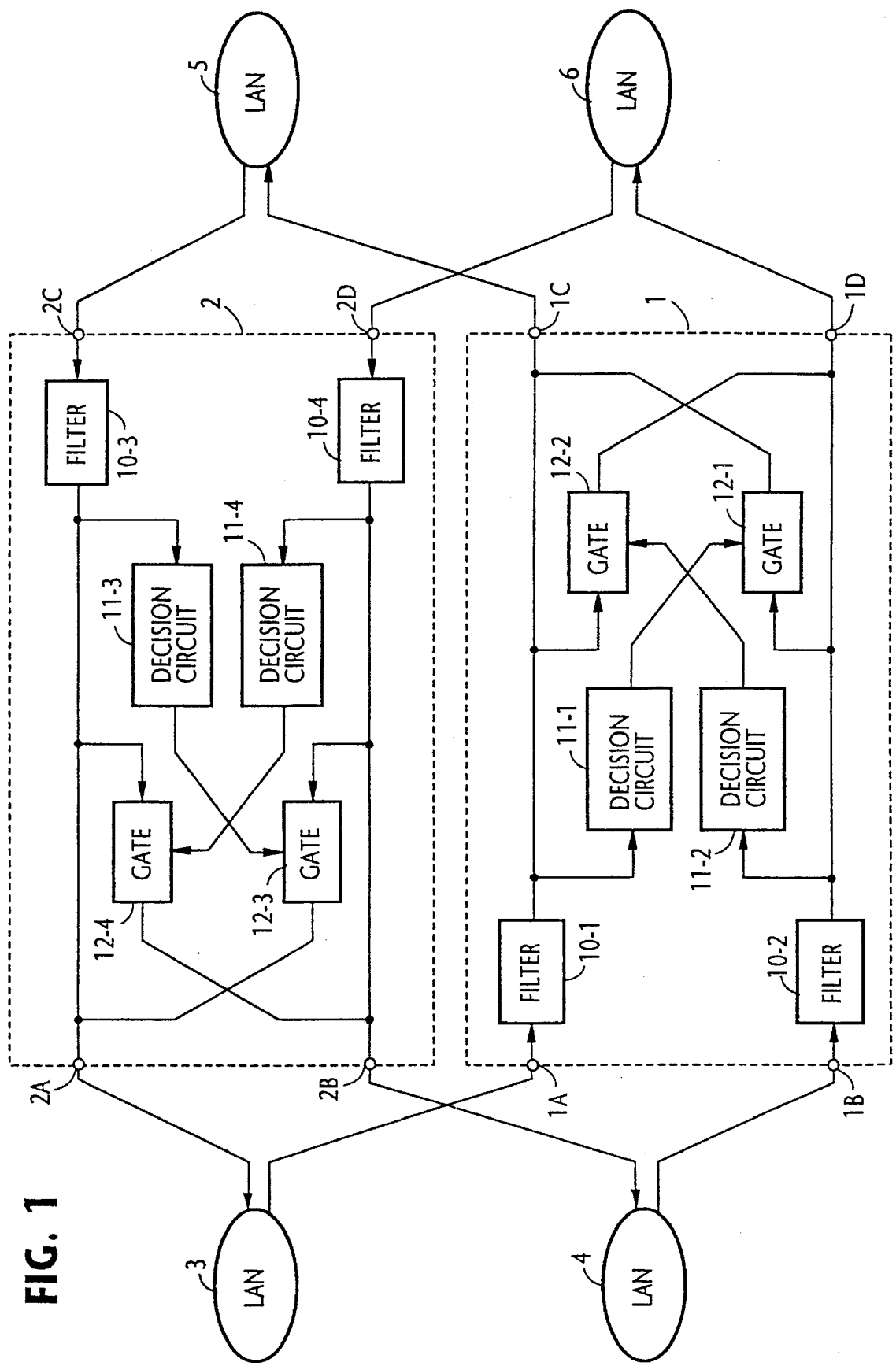
FIG. 1 is a block diagram of local area networks interconnected by bridges constructed according to the present invention.

Referring now to FIG. 1, there is shown 4-port LAN bridges 1 and 2 of identical configuration for interconnecting local area networks 3, 4, 5 AND 6. The bridges 1 and 2 are preferably located at equal distances from the LANs 3 to 6. The LAN bridge 1 is used for establishing connections from LANs 3 and 4 to LANs 5 and 6 and the bridge 2 for establishing connections from LANs 5 and 6 to LANs 3 and 4. Bridge 1 includes address filters 10-1 and 10-2, decision circuit 11-1 and 11-2, and gate circuit 12-1 and 12-2. The address filters 10-1 and 10-2 receive signals from LANs 3 and 4, respectively, via input ports 1A and 1B and supply their outputs to the decision circuits 11-1 and 11-2, respectively. The gate circuit 12-1 is connected between the output of filter 10-2 and an output port 1C which leads to LAN 5 and the gate circuit 12-2 is connected between the output of filter 10-1 and an output port 1D leading to LAN 6. In like manner, bridge 2 includes address filters 10-3 and 10-4, decision circuit 11-3 and 11-4, and gate circuits 12-3 and 12-4. The address filters 10-3 and 10-4 receive signals from LANs 5 and 6 via input ports 2C and 2D and supply their outputs to the decision circuits 11-3 and 11-4, respectively. The gate circuit 12-3 is connected between the output of filter 10-4 and an output port 2A which leads to LAN 3 and the gate circuit 12-4 is connected between the output of filter 10-4 and an output port 2B leading to LAN 4. Each of the address filters 10-1 to 10-4 is cleared at periodic intervals.

Each of the decision circuits holds the header information of packets to be rejected and compares the header of each incoming packet with each of the stored headers. If a coincidence is detected, the decision circuit turns off the associated gate circuit to prevent the matched incoming packet from being forwarded onto the outgoing terminal.

Figure 2:
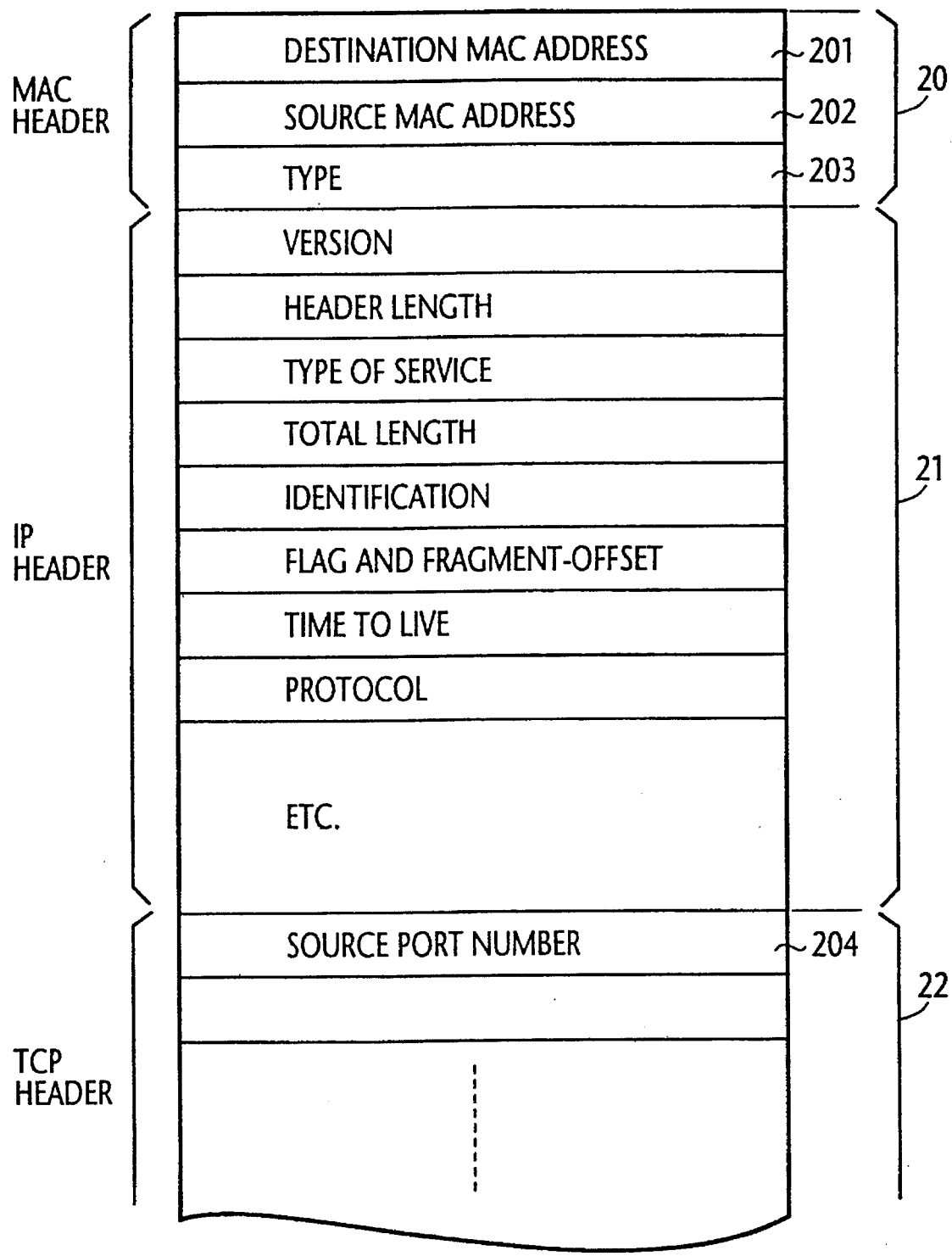
FIG. 2 is an illustration of the format of packets used in the local area networks.

As a typical example shown in FIG. 2, each packet is formatted as comprising a MAC (media access control) header 20 corresponding to the MAC layer (a lower subdivision of the OSI data link control layer), and an Internet Protocol (IP) header 21 and a Transmission Control Protocol (TCP) header 22 corresponding respectively to the OSI network and transport layers. The MAC header 20 contains a destination MAC address field 201, a source MAC address field 202 and a type field 203. Since the present invention is concerned with TCP/IP, a code "0800" is stored in the type field 203. If Xerox Network System (ZNS) is used, a code "0600" will be stored in the type field. The IP header 21 includes a version field, a header-length field indicating the header length of the IP packet, a type-of-service field, a total-length field, an identification field for identifying fragmented data, a flag-and-fragment-offset field for indicating the positions of fragmented data in the original packet, a time-to-live field for indicating the length of time during which a packet exists in the network, a protocol field identifying the protocol of the upper layer, and other fields. The TCP header 22 includes interalia a source port number field 204 which identifies the port of a source host. The combination of data in the type field 203 and data in the source port number field 202 indicates the type of particular application software used in the upper layer.

As illustrated in FIG. 3, each of the filters 10 comprises a registration table 30, a source address detector 31, a destination address detector 32, a comparator 33, a gate circuit 34 and a read/write controller 35. A packet from the associated LAN is supplied to the source address detector 31 and destination address detector 32 as well as to gate circuit 34. Source address detector 31 extracts the source MAC address from the packet and stores it into the table 30 into a location specified the read/write controller 35 if it is not already stored in the table. Read/write controller 35 causes the registration table to sequentially read the stored addresses to the comparator 33. Destination address detector 32 extracts the destination MAC address from the packet and supplies it to the comparator 33 where it is compared with each of the addresses read out of the registration table 30. If the same MAC address is detected, comparator 33 recognizes that the packet is destined to the home network and turns off the gate circuit 34 to prevent the packet from being forwarded from the filter 10 to the associated output port. If the same MAC address is not detected in the decision circuit 11-1, for example, the comparator 33 of the decision circuit recognizes that the packet is destined to other networks and turns on the gate circuit 34 to allow it to be forwarded onto LAN 5 via the associated output port 1C as well as to LAN 6 through the gate circuit 12-2 if the latter is gated on in a manner will be described hereinbelow.

FIG. 4 shows details of each decision circuit 11. The decision circuit includes a registration table 40, a type-and-port-number detector 41, a read/write controller 42, a comparator 40 and a timer 44. The registration table 40 has a plurality of entries for storing types and port numbers supplied via the read/write controller 42 from an external source, not shown, to identify those multimedia application software whose transmissions are to be protected from transmissions from other local area networks. Detector 41 extracts the type field 203 and source port number field 204 from each incoming packet supplied from the associated address filter and supplies the extracted type and port number data to the comparator 43. Read/write controller 42 responds to the arrival of the packet at the detector 41 for sequentially reading each combination of the stored types and port numbers data out of the table 40 into the comparator 43 where it is compared against the data extracted by the detector 41. If they match, comparator 43 activates the timer 44. Timer 44 produces a pulse for a period ranging from 30 seconds to 3 minutes depending on the type of applications. The output pulse of the timer 44 is supplied to the control terminal of the associated gate circuit 12 so that the gate circuit 12, which is normally in a turn-on state, is turned off to prevent the passage of packets therethrough.

If the registration table 40 of decision circuit 11-1 stores codes "0800" and "280" in the type and port number fields, respectively, for example, and if multimedia application packets containing the corresponding header information are transmitted from LAN 3 to LAN 5, the comparator 43 of decision circuit 11-1 detects a coincidence and activates the timer 44. Therefore, the gate circuit 12-1 is turned off for a period of time specified by the timer 44. If non-multimedia packet data are simultaneously transmitted from LAN 4 to LAN 6, such non-multimedia packets are prevented by the gate circuit 12-1 from being forwarded onto output port 1C. Thus, for the specified time interval, the multimedia transmission from LAN 3 to LAN 5 is not interfered with non-multimedia transmissions from LAN 4 to LAN 6. Because of the non-multimedia application packets from LAN 4 to LAN 6, decision circuit 11-2 keeps the gate circuit 12-2 in the turn-on state, allowing multimedia packets from LAN 4 to be forwarded onto LAN 6 via output port 1D as well as to LAN 5 via output port 1C.

What is claimed is:

1. A bridge for interconnecting a plurality of local area networks, comprising:

header detector means for detecting a packet header contained in a packet transmitted from a first local area network to a second local area network;

registration means for storing information representing packets which are to be protected from interference by other packets;

comparator means for comparing the packet header detected by said header detector means with the information stored in the registration means to detect a match or mismatch;

gate means responsive to a match detected by said comparator means for preventing said other packets from being forwarded to said second local area network and responsive to a mismatch detected by said comparator means for allowing said other packets to be forwarded to said second local area network; and timer means responsive to a match detected by said comparator means for preventing said other packets from being forwarded to said second local are network for a specified period of time.

2. A bridge as claimed in claim 1, wherein the information stored In said registration means represents a packet header identifying multimedia application software.

3. A bridge as claimed in claim 1, further comprising address filter means for allowing packets from said first local area network to be forwarded to said second local area network if said packets are destined to local area network other than said first local area network.

4. A bridge for interconnecting a plurality of local area networks, comprising:

a plurality of header detectors associated respectively with said local area networks, each of the header detectors detecting a packet header contained in a packet transmitted from the associated local area network to a destination local area network;

a plurality of registration tables associated respectively with said local area networks, each of the registration tables storing information representing packets which are to be protected from interference by other packets;

a plurality of comparators respectively associated with said header detectors and respectively associated with said registration tables, each of the comparators comparing the packet header detected by the associated header detector with the information stored in the associated registration table to detect a match or mismatch;

a plurality of gate circuits associated respectively with said comparators, each of the gate circuits being responsive to a match detected by the associated comparator for preventing said other packets from being forwarded to said destination local area network and responsive to a mismatch detected by the associated comparator for allowing said other packets to be forwarded to said destination local area network; and a plurality of timers associated respectively with said comparators and associated respectively with said gate circuits, each of the timers being responsive to a match detected by the associated comparator for preventing said other packets from being forwarded through the associated gate circuit to said destination local area network for a specified period of time.

5. A bridge as claimed in claim 4, wherein the information stored in each of said registration tables represents a packet header identifying multimedia application software.

6. A bridge as claimed in claim 4, further comprising a plurality of address filters associated respectively with said local area networks, each of the address filters allowing packets from the associated local area network to be forwarded to said destination local area network if said packets are destined to local area networks other than the associated local area network.

7. A bridge for interconnecting a plurality of local area networks, comprising:

header detector to detect a packet header contained in a packet transmitted from a first local area network to a second local area network;

registration table for storing information representing packets which are to be protected from interference by other packets;

comparator for comparing the packet header detected by said header detector with the information stored in the registration table to detect a match or mismatch;

gate circuit responsive to a match detected by said comparator for preventing said other packets from being forwarded to said second local area network and responsive to a mismatch detected by said comparator for allowing said other packets to be forwarded to said second local area network; and timer responsive to a match detected by said comparator for preventing said other packets from being forwarded to said second local area network for a specified period of time.

8. A bridge as claimed in claim 7, wherein the information stored in said registration table represents a packet header identifying multimedia application software.

9. A bridge as claimed in claim 7, further comprising address filter for allowing packets from said first local area network to be forwarded to said second local area network if said packets are destined to local area networks other than said first local area network.

* * * * *